Oct. 15, 1935.  S. C. OSBORNE  2,017,509

ARC WELDING APPARATUS

Filed Dec. 19, 1932      6 Sheets-Sheet 2

INVENTOR
Samuel C. Osborne

Oct. 15, 1935.　　　　S. C. OSBORNE　　　　2,017,509
ARC WELDING APPARATUS
Filed Dec. 19, 1932　　　6 Sheets-Sheet 3

INVENTOR
Samuel C. Osborne.

FIG. 17.

Oct. 15, 1935.                S. C. OSBORNE                 2,017,509
                           ARC WELDING APPARATUS
                         Filed Dec. 19, 1932         6 Sheets-Sheet 5

INVENTOR

Oct. 15, 1935.　　S. C. OSBORNE　　2,017,509
ARC WELDING APPARATUS
Filed Dec. 19, 1932　　6 Sheets-Sheet 6

FIG. 19.

INVENTOR
Samuel C. Osborne.

Patented Oct. 15, 1935

2,017,509

UNITED STATES PATENT OFFICE 2,017,509

ARC WELDING APPARATUS

Samuel C. Osborne, Euclid City, Ohio, assignor to Wilson Welder and Metals Co. Inc., North Bergen, N. J., a corporation of New York Application December 19, 1932, Serial No. 647,876

37 Claims. (Cl. 219—8)

This invention relates to arc welding apparatus, and has particular reference to automatic arc welding apparatus adapted for use with relatively short welding electrodes.

Welding machines adapted for use with relatively short welding electrodes are ordinarily such that the arc must be extinguished in order to permit manual substitution of a new electrode for the substantially consumed one. Such practice is objectionable, because considerable time is lost not only in making electrode substitutions but also in carrying out such rewelding operations as may be necessitated by the formation of flaws in the welding incident to chilling or cooling of the metal at the weld when the arc is extinguished.

An important object of the present invention is to provide an improved machine, for use with relatively short electrodes, by which the above disadvantages may be overcome, and to these and other ends, I propose, as one form which my invention may take, to use two electrode holders arranged in constant angular relation to each other, and associated with means for feeding them toward and away from the work to be welded. The electrode holders shall be constructed to automatically grip suitable lengths of electrode on bared portions of their upper ends, when such electrodes are properly presented thereto, and shall be adapted to conduct the current into the electrodes through such bared portions. The electrode holders shall be associated with means for automatically presenting fresh electrodes thereto from suitable magazines and shall be capable of automatically releasing or ejecting the stubs of consumed electrodes. The electrode holders shall be so controlled that, when a suitable switch is closed, whichever one of them was last in use will feed its electrode toward the work, strike, and maintain the welding arc between the electrode and the work until such time as its electrode is nearly consumed, whereupon the second electrode holder will feed its electrode toward the work and in such a manner that its lower end will enter the arc. At the instant that the second electrode enters the arc the first electrode will be withdrawn thus permitting the arc to transfer from said first electrode to said second electrode. The electrode holder thus withdrawn will automatically release or eject the stub of the consumed electrode and thereafter automatically receive and grip a fresh electrode preparatory to repeating its described cycle of operation upon consummation of the electrode then in use. Thus by using the two electrode holders alternately and keeping the magazines filled, it is possible to maintain the arc indefinitely without interruption while either moving the work relative to the welding head or while moving the welding head relative to the work, the term "welding head" being herein employed, as is customary in the art to which this invention pertains, to designate broadly or generally a mechanism for supporting and feeding the electrodes with relation to the work.

Other objects and advantages of the invention will become apparent from the following description, taken in connection with the accompanying drawings, in which.

Figure 1:
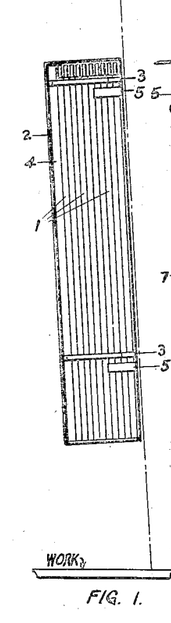
Fig. 1 is a side elevation of one of the magazines.
Figure 2:
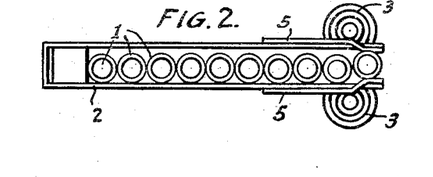
Fig. 2 is a plan view of the magazine shown in Fig. 1.
Figure 3:
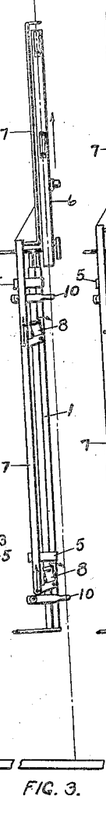
Fig. 3 is a side elevation of an electrode dispensing and presenting mechanism, showing one position of one of the electrode holders.
Figures 4, 7:
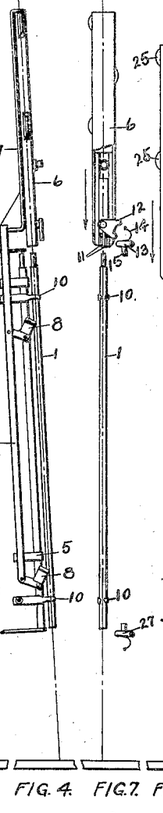
Fig. 4 is a view similar to that of Fig. 3, and showing another position of the same electrode dispensing and presenting mechanism and another position of its associated electrode holder.
Fig. 7 is an end elevation of the electrode holder 6 and the electrode 1 in the position of Fig. 4.
Figure 5:
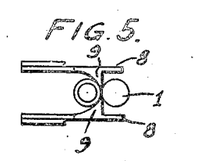
Fig. 5 is a plan view of the bell cranks 8, in the position of Fig. 3, showing the prongs 9 which push the electrode out of the magazine.
Figure 6:
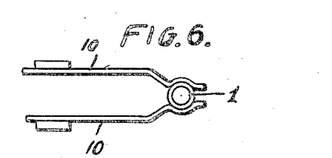
Fig. 6 is a plan view of the guide springs 10.

Referring more specifically to the drawings, Fig. 1 and Fig. 2 show the welding electrodes 1 stacked in the magazine frame 2, and held by the tension of the clock springs 3, which pull on the backing bar 4, against the clamp springs 5. In Fig. 3 the electrode holder 6 is moving up but has not yet started to lift the draw bar 7 which, when lifted as shown in Fig. 4, where the electrode holder 6 has reached the top of its stroke, turns the bell cranks 8 from the position shown in Fig. 3 to that of Fig. 4. These bell cranks 8 are supplied with prongs 9 (see Fig. 5) which push the first electrode in the magazine past the clamp springs 5 into the guide springs 10 (see Fig. 6) in line with the electrode holder 6, which then stops at the top of its stroke, as shown in Fig. 4 and Fig. 7.

Figures 8, 9, 11, 12:
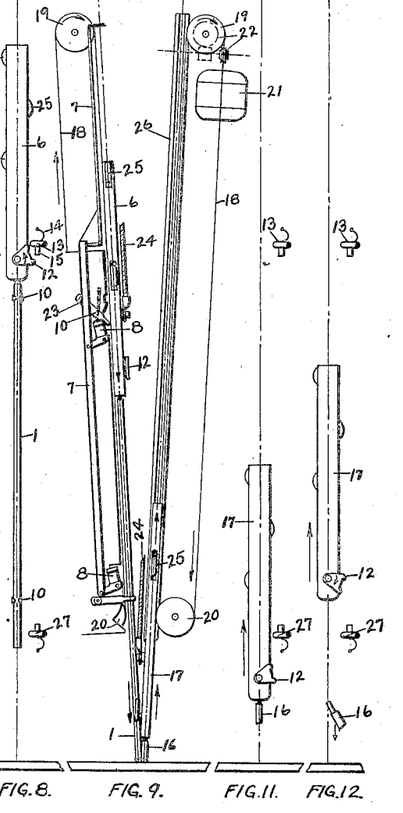
Fig. 8 is a view similar to that of Fig. 7 and showing the electrode holder 6 after it has gripped the electrode 1.
Fig. 9 is a partial side elevation of the welding head, showing the positions of the electrode holders and their associated parts at the instant of the arc transfer.
Fig. 11 is an end elevation of the electrode holder 17.
Fig. 12 is a view similar to that of Fig. 11, and showing another position of the electrode holder.

When a new electrode is required the electrode holder 6 starts down and in moving from the position shown in Fig. 7 to that of Fig. 8 the jaws 11 slip over the bare end of electrode 1, and, as the cam 12 strikes the latch 13, the cam 12 turns from the position of Fig. 7 to that of Fig. 8, thus closing the jaws 11 so that they grip the electrode 1. It will be noticed that the latch 13 is pivoted at its outer extremity and held by a spring 14 against a stop 15 below it. This permits the cam 12 to pass the latch 13 on its up stroke without turning.

Figure 10:
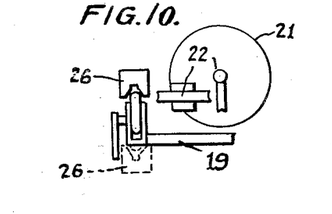
Fig. 10 is a plan view of one of the electrode-holder-actuating motors and its associated transmission mechanism.
Figure 13:
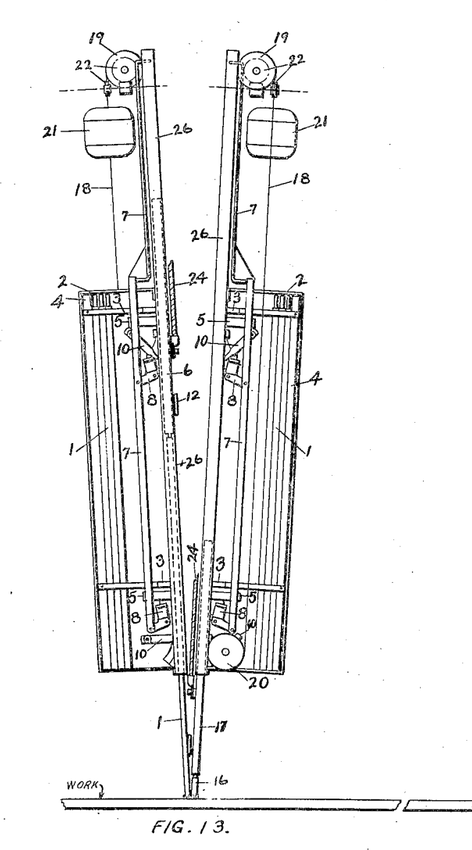
Figs. 13 and 14 are side and end elevations, respectively, of the complete device or welding head, showing the assembled relation of the various mechanisms.
Figure 14:
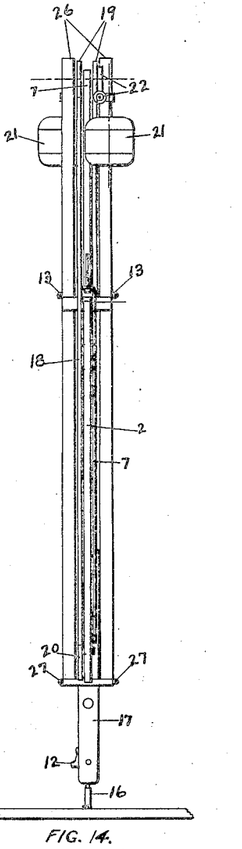

Fig. 9 shows the position of the various parts just as the fresh electrode 1 enters the arc between the almost consumed electrode stub 16 and the work. At this instant the electrode holder 6 is moving down and in another moment, when the arc transfers from the stub of the consumed electrode 16 to the fresh electrode 1, the electrode holder 17 will start up, withdrawing the stub 16. Fig. 9 also shows the electrode-holder-actuating mechanism which consists of the bands 18, fastened to the electrode holders 6 and 17, which pass over the driving drums 19 at the top and the idler drums 20 at the bottom. The driving drums 19 are driven by the motors 21 through the worm-gear transmissions 22, one of such motors and one of such transmissions being omitted from Fig. 9 for the sake of clarity. It will also be noted in Fig. 9 that the electrode dispensing and presenting mechanism comprising the draw bar 7 and the bell cranks 8 has returned to the position of Fig. 3, and that the upper guide or loading spring 10 has been pushed out of the way by the electrode holder 6 and has swung down on its pivot 23. The current is conducted into each electrode holder through the flexible cables 24 and thence through the jaws 11 to the electrodes. The electrode holders are each supplied with three annular ball bearing rollers 25 which run in the V-guides 26, one of which is shown in back of the electrode holder 17 in Fig. 9 (see also Figs. 10, 13, and 14).

As the electrode holder 17 starts up it must pass the lower latch 27 as shown in Figs. 11 and 12. Thus as it passes from the position of Fig. 11 to that of Fig. 12 the cam 12 strikes the latch 27 and is turned from its position in Fig. 11 to that in Fig. 12, which opens the jaws 11 and ejects the stub 16.

Figure 15:
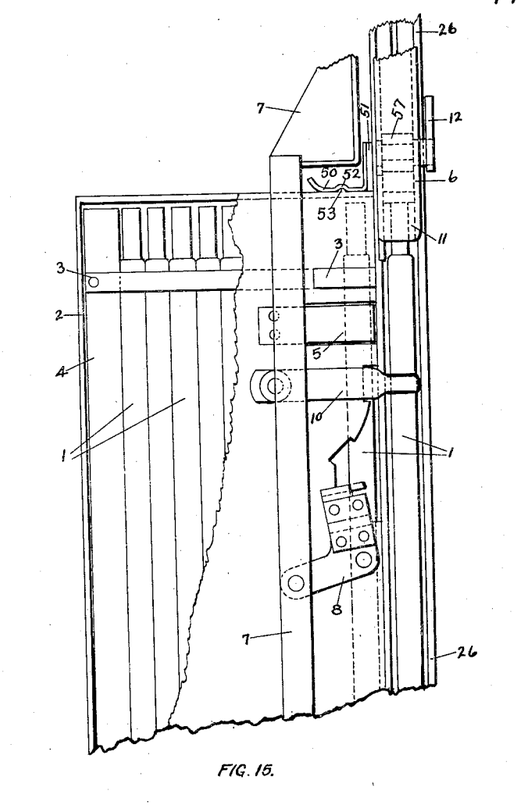
Fig. 15 is an enlarged partial side elevation of the upper part of one of the magazines and its associated electrode dispensing and positioning mechanism, showing one form of catch which might be used to detachably fasten the magazines to the frame of the welding head.

In order that the magazines may be so held in their operative positions as to permit them to be readily removed for the purpose of refilling them with electrodes, there are provided a plurality of latches which are arranged to engage the upper and lower ends of the magazines. Each of these latches, of which only one is herein shown, comprises, as shown in Fig. 15, a spring member 50, fixed to the welding head frame 51 and provided with a notch 52 which is adapted, as the magazine is placed in position, to snap over a projection 53 provided on the magazine, it being understood that the number of projections 53 will correspond to the number of latches employed, although only one such projection is herein shown.

Figure 16:
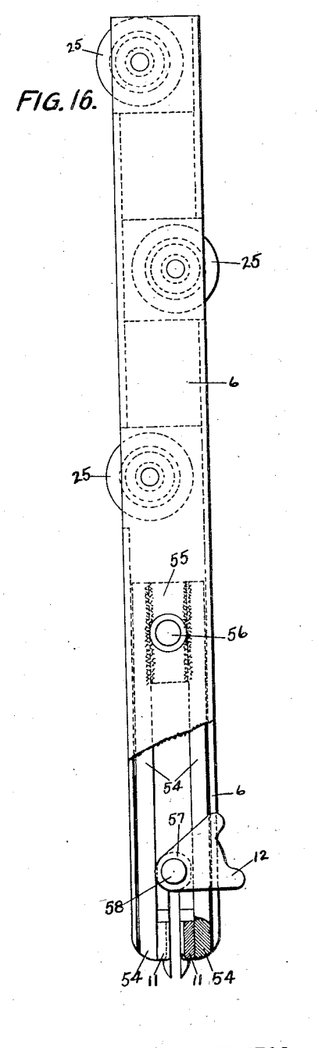
Fig. 16 is an enlarged view, partly in section and partly in elevation, of one of the electrode holders, showing its jaws in detail.

Fig. 16 shows the jaws 11 mounted on the bars 54, which are fixed to the block 55 by which the cable stud 56 is carried. The bars 54 are so set that they must be sprung apart in order to get an electrode between the jaws 11. This spreading of the bars 54 is accomplished by turning the cam 57 which is part of the shaft 58 on which the cam 12 is mounted. Thus the jaws 11 may be opened or closed by turning the cam 12 through a small angle as explained above. Also the angle of motion of the cam 12 is limited by stops not shown so that it can not be turned beyond the positions shown in Figs. 7–11 and 8–12.

The method of initiating or controlling the various mechanical motions will now be explained. Referring to the wiring diagram Fig. 17, this shows that each electrode holder is supplied with a motor (21 and 28), a potential relay (29 and 30) which has its coil normally connected across the arc, a resistance bridge (31 and 32) to supply the armature current for the motor, a current relay (33 and 34) to initiate the withdrawal of the stub, a switch (35 and 36) to start the downward motion, another switch (37 and 38) and resistor (39 and 40) to lengthen the arc as it transfers from one electrode to the other, and a rheostat (41 and 42) to adjust the arc voltage. In addition to the above duplicate equipment, there is a common field rheostat 43, so that the speed of both motors can be adjusted for various welding conditions, and a switch 44 for starting and stopping the entire mechanism or welding head. As to the current relays (33 and 34), it is to be understood that they are so arranged that their coils, when energized, will open their contacts (45 and 46), and that such contacts are so interlocked that when both coils are deenergized the contacts of only one relay may close.

Figure 17:
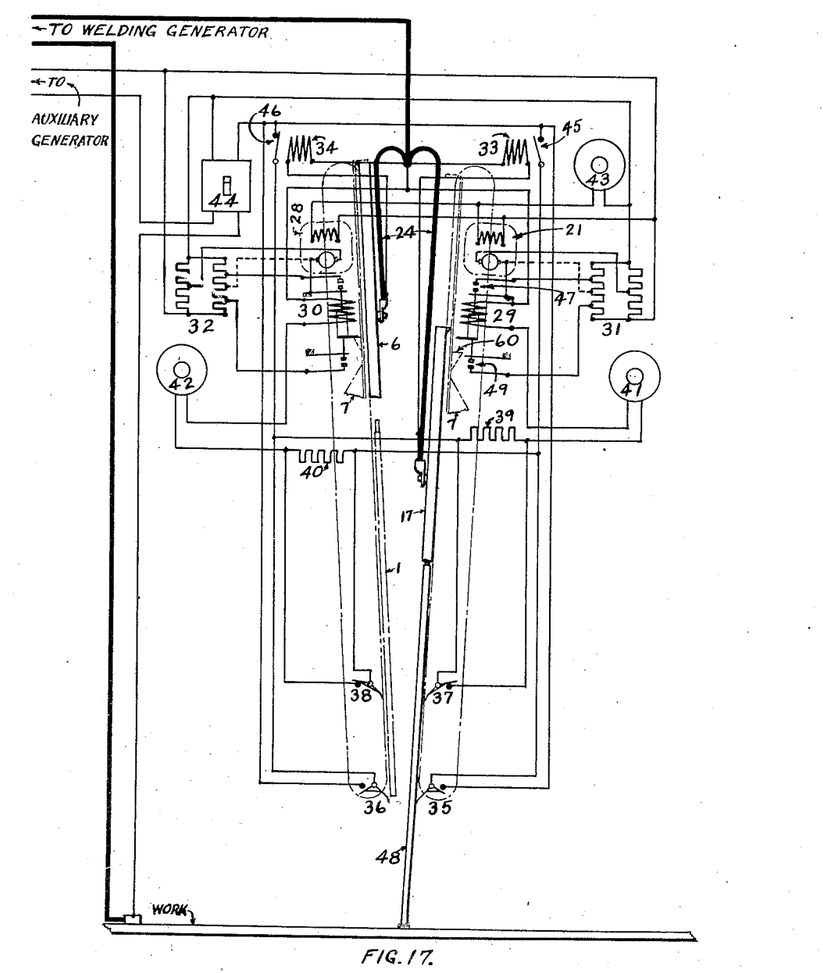
Fig. 17 is a schematic wiring diagram of the electrical connections employed in the preferred mode of control for the welding head.

In describing the operation of the device, reference being had to Fig. 17, it will be assumed that the contacts 45 and 46 of the current relays 33 and 34 are in open and closed positions, respectively, it being borne in mind that these contacts are so interlocked that one of them will be maintained closed and the other open while their related current relay coils are deenergized. If, under the foregoing assumed conditions, the switch 44 is closed, a ground circuit will be established through the coil of the potential relay 29 and will energize that relay. The potential relay 29, when thus energized, will pick up its armature and close its upper contacts 47, causing its associated motor 21 to start feeding its electrode holder 17 down. When the electrode 48 in holder 17 strikes the work, it will short the coil of the potential relay 29, thus causing the upper contacts 47 to open and the lower contacts 49 to close, reversing the motor 21. As the electrode 48 is drawn away from the work, upon reversal of the motor 21, it will strike the arc, and the potential relay 29, upon again being energized, opens the contacts 49 and closes the contacts 47, thus causing the motor 21 to feed the electrode 48 toward the work as it is consumed in the arc. The potential relays also control the speed at which the electrode is fed toward the work by alternately energizing and deenergizing the motors, thus maintaining the arc at the proper voltage.

The electrode holder is so arranged with relation to the switches 35 and 37 that the switch 35 is closed prior to the switch 37, during the descent of the electrode holder. As the electrode 48 is consumed, the electrode holder 17 is fed toward the work and will first close the switch 35 which will start the holder 6 downward by energizing the coil of its potential relay 30. As the holder 6 travels down it will grip the electrode 1 and feed it into the arc. Just as the electrode 1 enters the arc, the holder 17 will open the switch 37 and cut a resistance 39 in series with the coil of the potential relay 29, thus increasing the length of the arc on the electrode 48. As the potential relay 30 at that time has no such resistance in series with its coil, due to the fact that the switch 38 is as yet maintained closed, the electrode 1 will be fed closer to the work than the electrode 48, with the result that the arc will be caused to transfer from electrode 48 to electrode 1. When current starts to flow in the electrode 1, the current relay 34 will be energized, whereupon its contacts 46 will be opened, with the result that the potential relay 29 will be deenergized, thus permitting its lower contacts 49 to close. Upon closing the contacts 49, the motor 21 will reverse, thus withdrawing the stub of electrode 48 from the arc, which stub is ejected, in the manner hereinbefore described, from the holder 17 as it is returned to its normal or uppermost position.

As the holder 17 reaches the top of its stroke and lifts the draw bar 7, a projection 60 on the draw bar will lift the armature of the potential relay 29 and open the contacts 49, thus stopping the motor 21 and thereby halting the return movement of the holder 17.

Following the transfer of the arc from the electrode 48 to the electrode 1, the operation and control of the electrode holder 6 is carried out in a manner described in connection with the electrode holder 17, it being understood that a repeat operation of the holder 17 is initiated at such time as the holder 6 moves into engagement with and closes the switch 36 to energize the potential relay 29. It is well known that if a welding operation is suddenly discontinued by quickly removing the electrode and thus breaking the arc, a fault in the weld will result. This can be avoided by slowly withdrawing the electrode until the arc breaks. To accomplish this end, the switch 44 shall be made up of two single pole switches, one, connected in the circuit of the potential relays, shall be of the quick make and break type, while the other, connected in the motor supply line, shall be of the quick-make delay-break type. This will cause whichever motor is in use at the instant the switch 44 is thrown to run for a short time in reverse after its corresponding potential relay has been deenergized, and will result in the electrode that is then in use being relatively slowly withdrawn a sufficient distance to break the arc.

The foregoing operation may be altered or modified, if desired, in the two following particulars:

(a) The fresh electrode may be fed toward the work and into a position adjacent the almost consumed stub but at such a point that it does not actually enter the arc. Then, when said fresh electrode contacts with the work, it will short circuit and extinguish the arc between said almost consumed stub and the work. The control means will then cause the withdrawal of said stub, and another arc will be struck between said fresh electrode and the work. This mode of operation does not require any change in the mechanism described, except a slightly greater separation of the electrodes.

Figure 19:
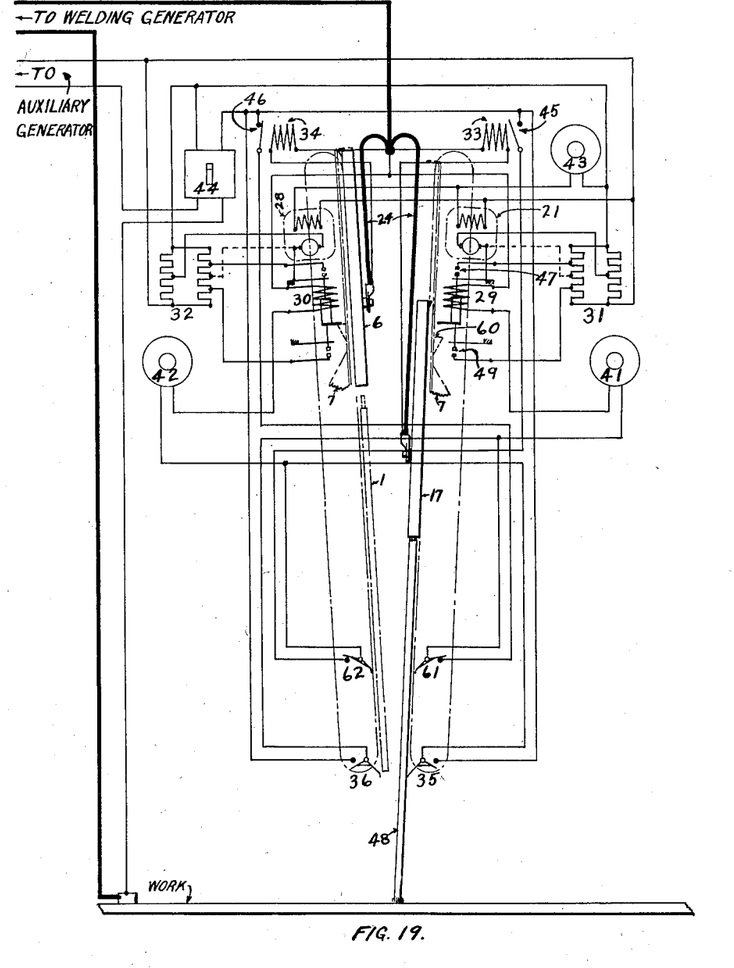
Fig. 19 is a schematic wiring diagram of the electrical connections employed in another mode of control for the welding head.

(b) The arc between the almost consumed stub and the work may be extinguished before the fresh electrode contacts with the work and strikes another arc. This mode of operation requires only a slight change in the electrical connections, as shown in the wiring diagram Fig. 19, from which the resistors 39 and 40 of Fig. 17 are omitted and in which the potential relays 29 and 30 are adapted to be respectively connected to the contacts 46 and 45 only through the switches 61 and 62 respectively.

Although either of the foregoing modified modes of operation is feasible neither would prevent a fault in the weld, because the arc would actually be extinguished for a short interval when transferring the welding operation from one electrode to the other, and they are, therefore, not preferred to the mode of operation herein earlier described in detail.

Figure 18:
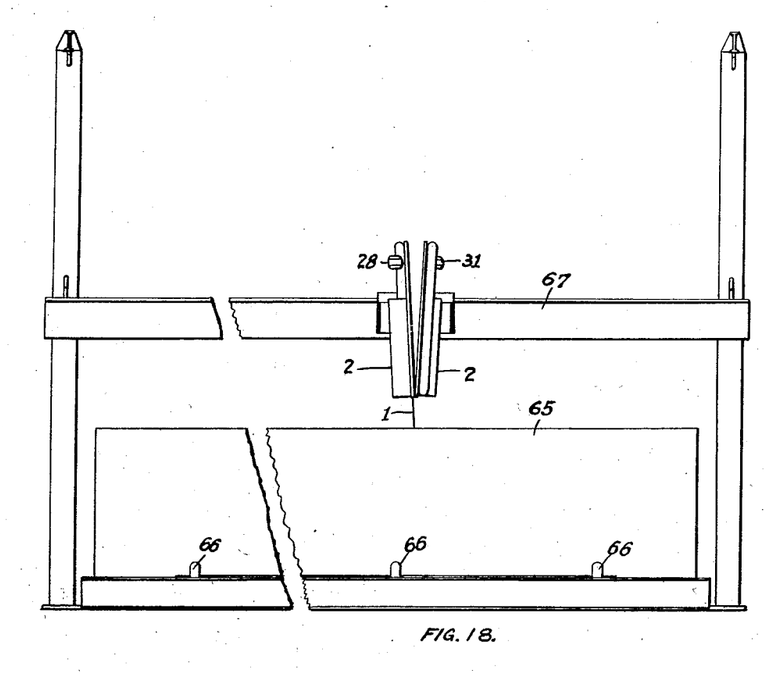
Figs. 18 and 18A are outline views illustrating, respectively, in side and end elevations a possible application of my invention to the welding of large structures, such as pipes or tanks.
Figure 18A:
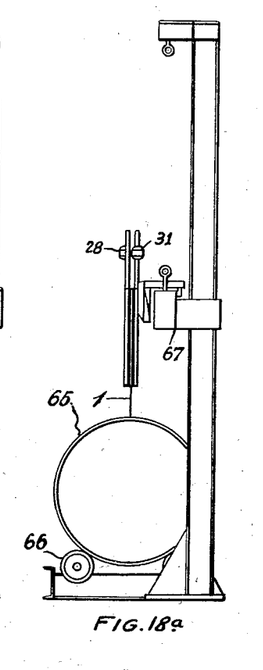

Although the device embodying this invention is not limited for use with respect to any particular class of work, a possible application of it to the welding of large structures is illustrated in Figs. 18 and 18A, wherein the work, such as a pipe 65, is supported in a horizontal position on a plurality of rollers 66 which enable the work to be rotated by suitable means, not shown, as when the welding operation is to be carried out to produce an annular seam. Inasmuch as the welding head is supported for longitudinal movement along a horizontally disposed rail 67, which constitutes an element of the frame structure shown, the welding operation may be carried out in a straight line longitudinally of the work by moving the welding head along that rail while maintaining the pipe 65 stationary. Since the pipe 65 is mounted for rotation and inasmuch as the welding head is supported for longitudinal movement with relation to the pipe, it follows that by simultaneously moving both the work and the welding head, the welding operation may be also carried out along any other desired path.

Aside from the modifications herein shown and described, it will be understood that various other changes may be made without departing from the spirit of the invention or the scope of the following claims.

Other modes of applying the principle of my invention may be employed instead of the ones explained, change being made as regards the mechanism herein disclosed, provided the means stated by any of the following claims or the equivalent of such stated means be employed.

I therefore particularly point out and distinctly claim as my invention:—

1. Automatic arc-welding apparatus for continuous welding with a plurality of electrodes comprising a pair of motor-reciprocated electrode holders, electric motors for individually reciprocating said holders, and motor control means actuated in accordance with the position of the electrode holders for selectively rendering one of said motors effective to actuate its corresponding electrode holder.

2. Automatic arc-welding apparatus for continuous welding with a plurality of electrodes comprising a pair of motor-driven electrode holders, electric motors for driving said holders, means actuated in accordance with the position of said holders for starting and stopping each motor, and motor control means operating in accordance with the voltage across the arc for controlling the electrode feeding operation of each motor.

3. Apparatus for metallic-arc welding comprising a pair of electrode holders mounted for reciprocating movement, motors for driving said holders, current reversing means operating in accordance with the voltage across the arc for controlling said motors, magazines for holding a supply of separate lengths of electrodes for said holders and means for delivering the electrodes from said magazines to said holders.

4. Automatic arc-welding apparatus for continuous welding with a plurality of electrodes comprising two reciprocating electrode holders, electric motors for operating said holders, means actuated in accordance with the position of said holders for delivering electrodes to said holders, and means for causing the arc to transfer from one electrode to the other when one electrode is nearly consumed.

5. Automatic arc-welding apparatus for continuous welding with a plurality of electrodes comprising a pair of electrode holders, a pair of motors for operating said holders, a pair of potential relays to control said motors, and arranged to be alternately connected across the arc, and a pair of interlocking current relays each parallel connected to a portion of the welding circuit for one electrode which cause the withdrawal of one electrode upon the transfer of the arc from it to the other electrode.

6. Automatic arc-welding apparatus comprising two electrode holders mounted for alternate reciprocating movement, means for moving said holders, means for feeding separate electrodes to each holder, means for lengthening the arc between the work and one electrode as the other electrode approaches the work, and means for causing one electrode holder to move away from the work upon the transfer of the arc from one electrode to the other.

7. In a welding head for automatic arc-welding apparatus, the combination of a reciprocating electrode holder, an electrode magazine adjacent the plane of travel of said holder, means actuated in accordance with the movement of the electrode holder for ejecting an electrode from said magazine, and means for holding the ejected electrode in position to be grasped by the electrode holder.

8. In automatic arc-welding apparatus having a pair of motor-driven electrode holders, means for automatically controlling each electrode holder motor in accordance with the voltage across the arc comprising a relay having its coil connected across the arc, means associated with said relay for reversing the current for said motor whereby the motor will draw the electrode away from the work when the voltage across the arc is less than a given value and move the electrode toward the work when said voltage exceeds that value, and means for maintaining one motor inoperative over a welding period as carried out with the electrode of one holder and for then rendering said one motor operative to move the electrode of the other holder into welding position and for thereafter rendering the other motor operative to return its corresponding holder to inactive position.

9. In automatic arc-welding apparatus having a pair of motor driven electrode holders, means for controlling the feeding of the electrodes by the motors comprising, for each motor, a current supply for said motor, a resistance bridge in said current supply, a relay actuated in accordance with the voltage across the arc and adapted to connect the motor armature to separate points on said resistance bridge whereby variations in the voltage across the arc will reverse said motor, and means actuated in accordance with the position of the electrode holders for selectively rendering said motors alternately effective to initiate and carry out alternate electrode feeding operations.

10. In automatic arc-welding apparatus having a pair of motor-driven electrode holders, means for automatically controlling each electrode holder motor in accordance with the voltage across the arc comprising a relay having its coil connected across the arc, current reversing means cooperating with said relay to reverse the current to said motor, and means actuated in accordance with a predetermined position of the electrode to add resistance to the relay circuit, whereby the arc is lengthened.

11. In automatic metallic-arc welding apparatus having reciprocating electrode holders and means for supplying electrodes automatically to said holders, apparatus for securing the electrodes in said holders comprising movable members associated with said holders to grasp the electrodes supplied thereto, operating means for said members, and means external to said holder to cause clamping of the electrode by the holder as the holder moves toward the work and to release the electrode as the holder moves away from the work.

12. An automatic arc welding apparatus for continuous welding with a plurality of electrodes comprising a pair of electrode holders adapted to be alternately moved into and out of active position with relation to the work, power means for actuating said holders, and control means rendering said power means effective to move one holder into active position as the other holder approaches the work and for rendering the power means effective to return said other holder to its inactive position.

13. An automatic arc welding apparatus for continuous welding with a plurality of electrodes comprising a pair of electrode holders adapted to be alternately moved into and out of active position with relation to the work, power means for actuating said holders, control means operative as one holder approaches the work to render said power means effective to move the other holder into active position whereby the arc of the electrode of said one holder is transferred to the electrode of said other holder, and means responsive to such arc-transfer to render said power means effective to return said one holder to its inactive position.

14. An automatic arc welding apparatus for continuous welding with a plurality of electrodes comprising a pair of electrode holders adapted to be alternately moved into and out of active position with relation to the work, power means for actuating said holders, control means operative as one holder approaches the work to render said power means effective to move the other holder into active position whereby the arc of the electrode of said one holder is transferred to the electrode of said other holder, means responsive to such arc-transfer to render said power means effective to return said one holder to its inactive position, and means operating under the control of said holders immediately prior to such time as the arc is transferred from one electrode to the other to withdraw said one electrode to facilitate such arc-transfer.

15. An automatic arc welding apparatus for continuous welding with a plurality of electrodes comprising a pair of electrode holders adapted to be alternately moved into and out of active position with relation to the work, power means for actuating said holders, control means operating according to the position of one holder to render said power means effective to move the other holder into active position as said one holder approaches the work whereby the arc of the electrode of said one holder is transferred to the electrode of said other holder, and means responsive to such arc-transfer to render said power means effective to return said one holder to its inactive position.

16. An automatic arc welding apparatus for continuous welding with a plurality of electrodes comprising a pair of electrode holders adapted to be alternately moved into and out of active position with relation to the work, power means for actuating said holders, control means operating according to the position of one holder to render said power means effective to move the other holder into active position as said one holder approaches the work whereby the arc of the electrode of said one holder is transferred to the electrode of said other holder, means responsive to such arc-transfer to render said power means effective to return said one holder to its inactive position, and means operating under the control of said holders immediately prior to such time as the arc is transferred from one electrode to the other to withdraw said one electrode to facilitate such arc-transfer.

17. An automatic arc welding apparatus for continuous welding with a plurality of electrodes comprising a pair of electrode holders adapted to be alternately moved into and out of active position with relation to the work, power means for actuating said holders, control means rendering said power means effective to move one holder into active position as the other holder approaches the work and for rendering the power means effective to return said other holder to its inactive position, and means rendered effective as said other holder is returned to inactive position to relieve that holder of its unconsumed electrode.

18. An automatic arc welding apparatus for continuous welding with a plurality of electrodes comprising a pair of electrode holders adapted to be alternately moved into and out of active position with relation to the work, power means for actuating said holders, control means operative as one holder approaches the work to render said power means effective to move the other holder into active position whereby the arc of the electrode of said one holder is transferred to the electrode of said other holder, means responsive to such arc-transfer to render said power means effective to return said one holder to its inactive position, and means rendered effective as said one holder is returned to inactive position to relieve that holder of its unconsumed electrode.

19. An automatic arc welding apparatus for continuous welding with a plurality of electrodes comprising a pair of electrode holders adapted to be alternately moved into and out of active position with relation to the work, power means for actuating said holders, control means operative as one holder approaches the work to render said power means effective to move the other holder into active position whereby the arc of the electrode of said one holder is transferred to the electrode of said other holder, means responsive to such arc-transfer to render said power means effective to return said one holder to its inactive position, means rendered effective as said one holder is returned to inactive position to relieve that holder of its unconsumed electrode, and means under the control of said holders and operating immediately prior to such time as the arc is transferred from one electrode to the other to withdraw said one electrode to facilitate such arc-transfer.

20. An automatic arc welding apparatus comprising two electrode holders mounted for alternating reciprocating movement, means for moving said holders, means for feeding separate electrodes to each holder, and means for causing one electrode holder to move away from the work upon the transfer of the arc from one electrode to the other.

21. An automatic arc welding apparatus for continuous welding with a plurality of electrodes comprising a pair of electrode holders adapted to be alternately moved into and out of active position with relation to the work, power means for actuating said holders, means for delivering successive electrodes to each holder, the arc from the electrode of one holder being transferable, as such holder approaches the work, to the electrode of the other holder as the latter electrode approaches the work, and means for causing the electrode holder corresponding to the electrode from which the arc is transferred to move away from the work incident to such arc-transfer.

22. An automatic arc welding apparatus for continuous welding with a plurality of electrodes comprising a pair of electrode holders adapted to be alternately moved into and out of active position with relation to the work, power means for actuating said holders, means for delivering successive electrodes to each holder, the arc from the electrode of one holder being transferable, as such holder approaches the work, to the electrode of the other holder as the latter electrode approaches the work, and means responsive to such arc-transfer to cause the electrode holder corresponding to the electrode from which the arc is transferred to move away from the work.

23. An automatic arc welding apparatus for continuous welding with a plurality of electrodes comprising a pair of electrode holders adapted to be alternately moved into and out of active position with relation to the work, power means for actuating said holders, means for delivering successive electrodes to each holder, the arc from the electrode of one holder being transferable, as such holder approaches the work, to the electrode of the other holder as the latter electrode approaches the work, means for causing the electrode holder corresponding to the electrode from which the arc is transferred to move away from the work incident to such arc-transfer, and means operating incident to the return of said holders to their inactive positions to relieve them of their unconsumed electrodes.

24. An automatic arc welding apparatus for continuous welding with a plurality of electrodes comprising a pair of electrode holders adapted to be alternately moved into and out of active position with relation to the work, power means for actuating said holders, means for delivering successive electrodes to each holder, the arc from the electrode of one holder being transferable, as such holder approaches the work, to the electrode of the other holder as the latter electrode approaches the work, means responsive to such arc-transfer to cause the electrode holder corresponding to the electrode from which the arc is transferred to move away from the work, and means operating incident to the return of said holders to their inactive positions to relieve them of their unconsumed electrodes.

25. An automatic arc welding apparatus comprising two electrode holders mounted for alternating reciprocating movement, means for moving said holders, means for feeding separate electrodes to each holder, means for causing one electrode holder to move away from the work upon the transfer of the arc from one electrode to the other, and electro-responsive means operating according to variations in voltage across the arc between the work and a given electrode to control the welding position of that electrode.

26. An automatic arc welding apparatus for continuous welding with a plurality of electrodes comprising a pair of electrode holders adapted to be alternately moved into and out of active position with relation to the work, power means for actuating said holders, means for delivering successive electrodes to each holder, the arc from the electrode of one holder being transferable, as such holder approaches the work, to the electrode of the other holder as the latter electrode approaches the work, means for causing the electrode holder corresponding to the electrode from which the arc is transferred to move away from the work incident to such arc-transfer, and electro-responsive means operating according to variations in voltage across the arc between the work and a given electrode to control the welding position of that electrode.

27. An automatic arc welding apparatus for continuous welding with a plurality of electrodes comprising a pair of electrode holders adapted to be alternately moved into and out of active position with relation to the work, power means for actuating said holders, means for delivering successive electrodes to each holder, the arc from the electrode of one holder being transferable, as such holder approaches the work, to the electrode of the other holder as the latter electrode approaches the work, means responsive to such arc-transfer to cause the electrode holder corresponding to the electrode from which the arc is transferred to move away from the work, and electro-responsive means operating according to variations in voltage across the arc between the work and a given electrode to control the welding position of that electrode.

28. An automatic arc welding apparatus for continuous welding with a plurality of electrodes comprising a pair of electrode holders adapted to be alternately moved into and out of active position with relation to the work, power means for actuating said holders, means for delivering successive electrodes to each holder, the arc from the electrode of one holder being transferable, as such holder approaches the work, to the electrode of the other holder as the latter electrode approaches the work, means for causing the electrode holder corresponding to the electrode from which the arc is transferred to move away from the work incident to such arc-transfer, means operating incident to the return of said holders to their inactive positions to relieve them of their unconsumed electrodes, and electro-responsive means operating according to variations in voltage across the arc between the work and a given electrode to control the welding position of that electrode.

29. An automatic arc welding apparatus for continuous welding with a plurality of electrodes comprising a pair of electrode holders adapted to be alternately moved into and out of active position with relation to the work, power means for actuating said holders, means for delivering successive electrodes to each holder, the arc from the electrode of one holder being transferable, as such holder approaches the work, to the electrode of the other holder as the latter electrode approaches the work, means responsive to such arc-transfer to cause the electrode holder corresponding to the electrode from which the arc is transferred to move away from the work, means operating incident to the return of said holders to their inactive positions to relieve them of their unconsumed electrodes, and electro-responsive means operating according to variations in voltage across the arc between the work and a given electrode to control the welding position of that electrode.

30. In an automatic arc welding apparatus for continuous welding with a plurality of electrodes comprising a pair of electrode holders adapted to be alternately moved into and out of active position with relation to the work, power means for actuating said holders, electrode feed control means operable in response to a decrease in voltage across the arc to effect movement of a holder together with its electrode away from the work and responsive to an increase in voltage across the arc to effect movement of such holder together with its electrode toward the work, and means for maintaining said power means inactive with respect to one holder over a welding period as carried out with the electrode of the other holder and for then rendering the power means effective with respect to said one holder to move its electrode into welding position and for thereafter rendering said power means effective with respect to said other holder to move it to inactive position.

31. In an automatic arc welding apparatus for continuous welding with a plurality of electrodes comprising a pair of electrode holders adapted to be alternately moved into and out of active position with relation to the work, power means for actuating said holders, electrode feed control means operable in response to a decrease in voltage across the arc to effect movement of a holder together with its electrode away from the work and responsive to an increase in voltage across the arc to effect movement of such holder together with its electrode toward the work, means for maintaining said power means inactive with respect to one holder over a welding period as carried out with the electrode of the other holder and for then rendering the power means effective with respect to said one holder to move its electrode into welding position and for thereafter rendering said power means effective with respect to said other holder to move it to inactive position, and means rendered effective with respect to said holders as they are returned to inactive position to relieve each of them of its unconsumed electrode.

32. An automatic arc-welding apparatus for continuous welding with a plurality of electrodes comprising a pair of electrode holders, a pair of motors for operating said holders, a pair of potential relays to control said motors and arranged to be alternately connected across the arc, and a pair of interlocking current relays respectively responsive to a flow of current through such portions of the welding circuit as correspond to said holders to cause the withdrawal of one electrode upon the transfer of the arc from it to the other electrode.

33. An automatic arc-welding apparatus for continuous welding with a plurality of electrodes characterized by the fact that its welding circuit includes a pair of branches and by the fact that it comprises a pair of electrode holders, each adapted for the reception of an electrode, a pair of motors for operating said holders, a pair of potential relays to control said motors and arranged to be alternately connected across the arc, and a pair of interlocking current relays respectively responsive to a flow of current through said branches to cause the withdrawal of one electrode upon the transfer of the arc from it to the other electrode.

34. An automatic arc-welding apparatus for continuous welding with a plurality of electrodes comprising a pair of electrode holders adapted for the reception of electrodes and alternately adapted to move said electrodes into and out of active position with relation to the work, power means for actuating said holders, control means rendering said power means effective to so move one holder as to introduce its associated electrode into the arc of the other electrode, and means rendered effective as the electrode associated with said one holder enters the arc to lengthen that arc and cause it to transfer from said other electrode to the electrode associated with said one holder.

35. An automatic arc-welding apparatus for continuous welding with a plurality of electrodes adapted to be moved alternately into welding position with relation to the work, power means for moving said electrodes, control means rendering said power means effective to so move one electrode as to introduce it into the arc of the other electrode, and means rendered effective as said one electrode enters the arc of said other electrode to lengthen that arc and cause it to transfer to said one electrode.

36. In an automatic arc-welding apparatus for continuous welding with a plurality of electrodes one of which is adapted to be moved into the arc of another, means for moving said electrodes, and control means rendered effective as one electrode enters the arc of another to lengthen that arc and cause it to transfer to said one electrode.

37. In an automatic arc-welding apparatus for use with a plurality of electrodes adapted to be moved alternately into welding position with relation to the work, a pair of receptacles into each of which a supply of electrodes for use in the welding operation may be introduced during and without interrupting the welding operation, and means operating alternately with respect to said receptacles for removing said electrodes from said receptacles one after another and for moving them in that order into welding relation to the work.

SAMUEL C. OSBORNE.